US007185001B1

(12) United States Patent
Burdick et al.

(10) Patent No.: US 7,185,001 B1
(45) Date of Patent: Feb. 27, 2007

(54) SYSTEMS AND METHODS FOR DOCUMENT SEARCHING AND ORGANIZING

(75) Inventors: Bernard Burdick, Reading, MA (US); William Schoendorf, Bedford, MA (US); Ryan Thomas, Chelmsford, MA (US); Stan Heckman, Arlington, MA (US); Theodore Hall, Billerica, MA (US); Scott Bradley, Wakefield, MA (US)

(73) Assignee: Torch Concepts, Wakefield, MA (US)

( * ) Notice: Subject to any disclaimer, the term of this patent is extended or adjusted under 35 U.S.C. 154(b) by 643 days.

(21) Appl. No.: 09/971,868

(22) Filed: Oct. 4, 2001

Related U.S. Application Data

(60) Provisional application No. 60/237,525, filed on Oct. 4, 2000.

(51) Int. Cl.
*G06F 17/30* (2006.01)
*G06F 15/16* (2006.01)
(52) U.S. Cl. .................... 707/3; 707/4; 707/5; 715/700
(58) Field of Classification Search .................... 707/3, 707/4, 5, 10, 104.1; 704/235; 709/203
See application file for complete search history.

(56) References Cited

U.S. PATENT DOCUMENTS

| | | | | |
|---|---|---|---|---|
| 6,154,213 A | * | 11/2000 | Rennison et al. | ............ 715/854 |
| 2001/0049677 A1 | * | 12/2001 | Talib et al. | ..................... 707/3 |
| 2003/0140044 A1 | * | 7/2003 | Mok et al. | .................... 707/10 |

OTHER PUBLICATIONS

Cutting, D.R., et al. "Scatter/Gather: A Cluster-based Approach to Browsing Large Document Collections", Association for Computing Machinery, 1992.
Flores, R., "How Search Engines Work," http://home.earthlink.net/~cybersmartnow/articles/search_engines.html, Mar. 7, 2001.
Franklin, C., "How Internet Search Engines Work," http://www.howstuffworks.com/search-engine.htm/printable, Oct. 24, 2001.
"How Search Engines Work," http://searchenginewatch.com/webmasters/work.html, Mar. 7, 2001.
"How Search Engines Work," http://www.webreference.com/dlab/books/html-pre/43-1-1.html, Oct. 24, 2001.
"The Spider's Apprentice: A Helpful Guide to Web Search Engines," http://www.monash.com/spidap4.html, Oct. 24, 2001.

* cited by examiner

*Primary Examiner*—Etienne P. Leroux
*Assistant Examiner*—Hassan (Tony) Mahmoudi
(74) *Attorney, Agent, or Firm*—Fish & Neave IP Group of Ropes & Gray LLP; Jeffrey H. Ingerman; Jeffrey D. Mullen

(57) ABSTRACT

Systems and methods interactive document search, retrieval, categorization, and summarization are provided. A document organizer processor may analyze the content of documents, such as web pages and text documents, downloaded from a computer network, such as the Internet or an intranet, in response to a user's search query. After receiving a search query from a user, the processor may locate documents related to the query, parse words in the documents into a word set, filter out unnecessary words, group the documents into categories, provide labels for the categories, construct summaries of the documents in each category, determine if any additional words or phases are to be recommended, present the labels and summaries to the user, and enable the user to iteratively refine the search.

27 Claims, 8 Drawing Sheets

 CONTENT MANAGEMENT AND INFORMATION MINING
TORCH SEARCH
 Torch CONCEPTS

800

804

802 {
SEARCH:
RED                                              199 RESULTS
RED SOX SHORTSTOP, RED SOX MINOR, RED SOX HITTERS    89 RESULTS

806 {
CATEGORIES:
RED SOX LEAD        4 RESULTS
DAN DUQUETTE        5 RESULTS
RED SOX POWER       9 RESULTS
BRANDON RED SOX    11 RESULTS
RED SOX STREAK      5 RESULTS
EVANS RED SOX       8 RESULTS
RED SOX HITTERS     7 RESULTS
RED SOX BOGGS      18 RESULTS
HIT POWER          11 RESULTS
RED SOX WADE        5 RESULTS
RED SOX BRANDON     2 RESULTS
RED SOX YANKEE     24 RESULTS 808    810

☒ SUMMARIES OF RESULTS IN: RED SOX LEAD — 814     816   818

812 {
FILE:/HOME/BRADLEYS/ZZ2/IDAHO/TESTS/DATA/YAZ/HTML/Y1992/9108.HTM
NAMES LIKE CARL YASTRZEMSKI, JIM LONBORG, RICO PETROCELLI, GEORGE SCOTT, MIKE ANDREWS AND REGGIE SMITH ROLL OFF THE TONGUE. ... LESSER-KNOWN TEAMMATES SUCH AS DALTON JONES. RUSS GIBSON, GARY WASLEWSKI AND DARRELL BRANDON HAD A DAY IN THE SUNLIGHT THAT WOULD NEVER COME AGAIN. ...
FILE:/HOME/BRADLEYS/ZZ2/IDAHO/TESTS/DATA/YAZ/HTML/Y1992/13372.HTM
IT PLAYED TO CARPING REVIEWS (AND SMALL CROWDS) FROM 1961 UNTIL THE SPRING OF 1967. WHEN IT WAS REPLACED BY THE DICK WILLIAMS RED SOX, MAKERS OF AN IMPOSSIBLE DREAM. ... ON SEPT. 28, 1960. TED WILLIAMS TOOK HIS LAST MAJOR LEAGUE SWING. STROKING A JACK FISHER PITCH INTO THE RIGHT-CENTER-FIELD BULLPEN AT FENWAY PARK. ...
FILE:/HOME/BRADLEYS/ZZ2/IDAHO/TESTS/DATA/YAZ/HTML/Y1991/13818.HTM
"BLOSSER WAS ABOUT THE BEST HITTER IN THE DRAFT," BRITTON SAID. "PLUS. GEORGE DIGBY HAD KNOWN HIM FOR YEARS, AND HE KNOWS HITTERS BETTER THAN ANY SCOUT IN THE BUSINESS." ... SO, WHILE GREENE WAS BOSTON'S EIGHTH-RATED PLAYER. BLOSSER SOMEWHERE AROUND NO. 15, THE SOX WENT WITH BLOSSER. "EVERYONE IN THE ORGANIZATION SAID WE NEEDED SOME HITTERS," SAID BRITTON. "SO THAT'S WHAT WE ...
FILE:/HOME/BRADLEYS/ZZ2/IDAHO/TESTS/DATA/YAZ/HTML/Y1992/13386.HTM
THE RED SOX WERE ALWAYS NEW ENGLAND'S TEAM, YES, BUT IT TOOK THE IMPOSSIBLE DREAM OF 1967 TO TURN IT INTO A ROMANTICIZED MYSTIQUE AND KEEP THE LEGIONS COMING BY THE MILLIONS. ... THEY WERE ON THEIR WAY TO A 62-100 SEASON. FINISHING 40 GAMES BEHIND SAM MELE'S TWINS. "A LOT OF PLAYERS THOUGHT IT WAS FUNNY." RECALLS JERRY STEPHENSON, NOW THE ASSISTANT TO DODGER GENERAL MANAGER FRED CLAIRE. THEN A 21-YEAR-OLD ROOKIE PITCHER. "AND TO GUYS LIKE DENNIS BENNETT, IT WAS FUNNY." ...

☒ SUMMARIES OF RESULTS IN: DAN DUQUETTE

*FIG. 8*

SYSTEMS AND METHODS FOR DOCUMENT SEARCHING AND ORGANIZING

CROSS-REFERENCE TO RELATED APPLICATION

This claims the benefit of U.S. Provisional Patent Application No. 60/237,525, filed Oct. 4, 2000.

BACKGROUND OF THE INVENTION

The present invention relates to systems and methods for document searching and organizing. More particularly, the present invention relates to systems and methods for retrieving relevant documents from a computer network in response to a user's search query and organizing the retrieved documents into categories.

Search engines are used to explore the World Wide Web and build indices of available web pages. Search engines typically have three major elements: the spider (crawler), the index, and search engine software. The spider visits web pages to extract information from them to build an indexed database for the search engine. The spider searches for new web pages, as well as changes in web pages that have already been indexed by the search engine. Typically, search engines will run several spiders that explore the web as a team. The index serves as a storage space for the information found by the spider. The search software component of the search engine allows users to look for web pages containing information related to one or more search terms entered in a search query. The results of the search are displayed, and are typically ranked by a method that involves the location and the frequency of the search terms within the web pages.

Search engines are distinct from search directories. Search directories require individuals to submit information about a web site to the search directory. Editorial staffs maintain the search directory and classify the submitted web page information. A search directory user is only able to select from sites listed in the directory. While this approach typically produces high quality indices and allows for classification of web sites in a directory structure, the growth of the Internet makes the task of covering a large percentage of the Internet increasingly difficult for the editorial staff. As a result, searches performed using search directories often return too little useful information.

Keyword searching is the most common form of searching used by web search engines. Keywords indicating the content of a web page may be specified using meta tags. If a web page does not have meta tags, the search engine must determine the keywords of a web page. Search engines generally pull out and index words that are believed to be significant. Words that appear near the top of a document and words that appear frequently throughout a document are more likely to be considered important.

There are several problems associated with keyword searches. Keyword searches typically have a difficult time distinguishing between words that are spelled the same way, but have different meanings. Thus, a keyword search can produce results that are irrelevant to the intention of a user's query. In addition, search engines that use keyword searching typically do not perform "stemming," which is a process for determining the root word from a user-entered search term. Searching for relevant documents using root words can produce different results than a search conducted with non-root words. Furthermore, many search engines employing a keyword search do not return documents containing keywords that have the same meaning but are not listed in a user's query. Thus, documents potentially relevant to the user's query are not retrieved.

Unlike keyword search systems, concept-based searching attempts to determine the intended subject matter that the user is requesting in a query. A concept-based search engine generally returns a list of documents that are related to the subject of the search, even if the words in the document do not directly match the words in the query. Concept-based searching often involves "clustering," where the meanings of words are examined in relation to the words found nearby. However, search engines that use concept-based searching have exhibited varying levels of effectiveness in retrieving documents relevant to a user's search query.

Relevancy ranking is becoming increasingly critical to users as the volume of information available on the web grows. Users typically do not have time to sift through hundreds of documents or links to determine relevance. Some search engines use search term frequency as a method of determining whether a document is relevant. However, if the search term entered by the user in a search query is relatively common, or has multiple meanings, a search engine can produce search results which a user considers irrelevant to the user's intended search.

Accordingly, it may be desirable to provide systems and methods for interactively searching, retrieving, categorizing, and summarizing documents from computer networks that are relevant to a user's search query. Furthermore, it may be desirable to provide systems and methods for minimizing the opening, closing and reading of documents.

SUMMARY OF THE INVENTION

In accordance with the present invention, systems and methods for interactively searching, retrieving, categorizing, and summarizing documents are presented. Illustrative features of some embodiments of the present invention are described, for example, in the aforementioned U.S. Provisional Patent Application No. 60/237,525, filed Oct. 4, 2000, which is hereby incorporated by reference herein in its entirety.

The present invention is a document organizer processor that may analyze the content of documents, such as web pages or text documents, downloaded from a computer network, such as the Internet or an intranet, in response to a user's search query. The document organizer processor may allow a user to find desired information with a minimum of opening, closing, and reading of individual documents. Upon receiving a search query from a user, the processor may locate documents related to the query, parse words in the documents into a word set, filter out unnecessary words, group the documents into categories, provide labels for the categories, construct summaries of the documents in each category, present the categories and summaries to the user.

The document organizer processor may enable the user to iteratively refine the search query. A search may be refined by regrouping the documents in the category or categories of interest to yield a set of sub-categories with a finer level of resolution than achieved previously. Repetition of this action allows the user to achieve a grouping of specific documents that are most relevant to the intention of the original query. Thus, the opening and reading of multiple documents to find relevant information is minimized. At any time during the document grouping and re-grouping process, the user may revise the query using additional words or phrases that may or may not be suggested by the processor. The words or phrases that are suggested by the processor may be selected from category labels and document summaries such that more relevant documents may be retrieved. The user may view a document by selecting a link to the document or a summary for the document.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 8 shows an illustrative interactive document organizer display with selectable categories, document links, and document summaries in accordance with various embodiments of the present invention.

DETAILED DESCRIPTION OF THE INVENTION

Figure 1:
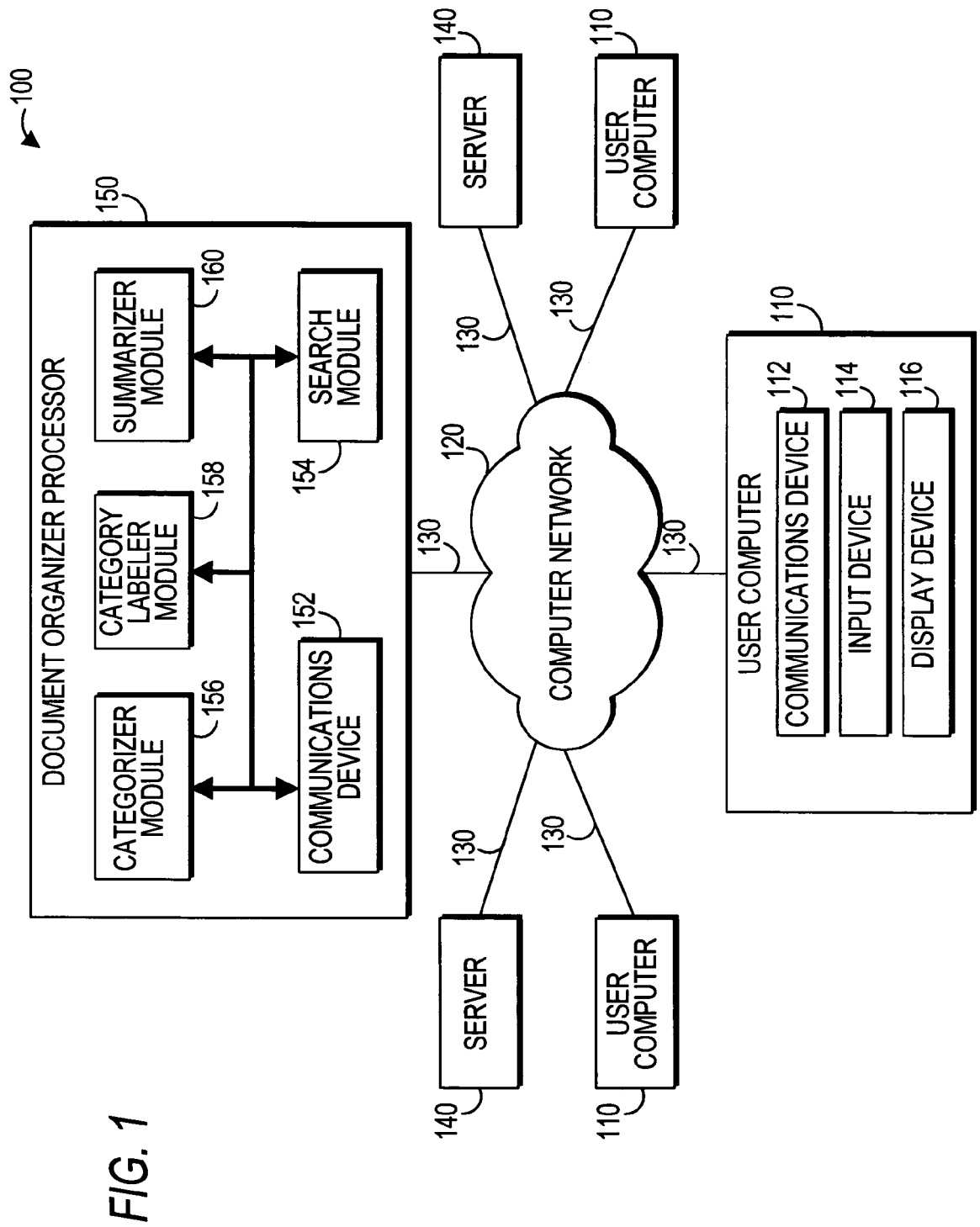
FIG. 1 shows an illustrative interactive document search and organization system including a computer network and a document organizer processor in accordance with various embodiments of the present invention.

As explained in more detail below, the present invention relates to systems and methods for interactively searching, retrieving, categorizing, and summarizing documents. A document organizer processor may locate documents related to a user's search query, parse words in the documents into a word set, filter out unnecessary words, group the documents into categories, provide labels for the categories, construct summaries of the documents in each category, present the categories and summaries to the user.

The document organizer processor may utilize clustering methods in order to group and categorize retrieved documents. Generally, there are two types of document clustering: nonhierarchical and hierarchical. Nonhierarchical clustering methods may group (partition) documents in a predefined number of clusters. Nonhierarchical clustering typically involves heuristics to generate partitions in an iterative manner. The determination of the final clusters using nonhierarchical clustering methods may depend on factors such as the order of documents being processed, the number of clusters, or a predefined threshold similarity level between documents.

Hierarchical clustering methods may group documents into a hierarchical tree of clusters. There are generally two types of hierarchical clustering: divisive clustering or agglomerative clustering. Divisive hierarchical clustering methods may form top-down cluster hierarchies by successively dividing more general clusters into finer (more specific) clusters. Divisive clusters are typically monothetic, which means that cluster members must contain certain terms.

Hierarchical agglomerative clustering methods may build bottom-up cluster hierarchies by successively agglomerating finer clusters to form more general clusters. Agglomerative clusters are typically polythetic, meaning that documents in a given cluster have some terms in common, but no particular term is required for membership in the cluster.

Hierarchical agglomerative clustering may begin by constructing a similarity matrix, whose elements contain document similarity scores for all of the document pairs to be clustered. Thus, document pairs with the highest similarity scores may be grouped and the similarity matrix may be updated by replacing the rows and columns of grouped items with those corresponding to the clusters. The process of clustering and recomputing similarities may be repeated. The result of hierarchical agglomerative clustering is a binary tree hierarchy of clusters, where the inter-cluster similarity levels increase with the depth of the tree.

Several methods may achieve hierarchical agglomerative clustering, including: the single linkage method, the complete linkage method, the group average method, and the minimum variance method. Other suitable methods may achieve hierarchical agglomerative clustering. The methods may differ in their approach to the computation of cluster similarities.

The single linkage method of hierarchical agglomerative clustering typically uses the most similar pair of documents (e.g., the nearest neighbor) between clusters in order to determine cluster similarity. Thus, clusters may be created where any cluster member has a greater similarity to at least one member of a cluster than any member of any other cluster. Generally, the single linkage method forms large, loosely bound clusters. However, single linkage hierarchical agglomerative clustering may be useful as a clustering method because of its computational efficiency.

The complete linkage method of hierarchical agglomerative clustering typically utilizes the least similar pair of documents (e.g., the furthest neighbor) between clusters to determine their similarity. Clusters may be created where any cluster member is more similar to the least similar member of that cluster than to the least similar member of any other cluster. The complete linkage method may form many small, tightly bound clusters.

The group average method of hierarchical agglomerative clustering uses the average of inter-cluster document pair similarities as the cluster similarity. Thus, the group average method may fall between the single and complete linkage methods.

The minimum variance method of hierarchical agglomerative clustering may join clusters whose fusion results in the least increase in the sum of distances from each document to the center of its cluster.

Cluster searching may determine the similarity between a search query and cluster representatives, where cluster representatives may consist of a predetermined number of the most frequent terms in clusters. Given a cluster hierarchy produced by hierarchical agglomerative clustering, cluster searching may be performed without computing all query-document similarities. Top-down searches may traverse to the child node with the highest query-cluster similarity until the cluster size falls below the minimum number of documents to retrieve or the query-cluster similarity falls below a predetermined threshold. Top-down searching may start at a level with predetermined threshold sized clusters. Top-down searching may work well with the complete linkage method, which may produce a large number of very small clusters even at the topmost levels. The combination of top-down search and complete linkage clustering requires the greatest computational resources of all cluster searching methods. The bottom-up search may start at the bottom of the tree and traverse upwards until a threshold similarity has been reached. The starting point of the bottom-up search is usually the bottom level cluster with relevant documents, which may be determined by query-document search if not already known.

The document organizer processor of the present invention use clustering methods that allow a user to select a set of clusters from which to dynamically generate a new set of clusters. The clustering of relevant documents by the document organizer processor may be query-dependent. Thus, clustered documents relevant to one query may not be relevant to another query. The clustering methods applied by the document organizer processor to a retrieved set of documents may find more relevant documents for a given query than a static clustering of the whole document collection.

The clustering methods used by the document organizer processor of the present invention may combine browsing, relevance feedback from a user, and dynamic clustering. The document organizer processor may present a number of query-dependent clusters, and may allow a user to select the relevant ones. Selection of the relevant clusters may invoke the repetition of the clustering methods by the document organizer processor. The interactive process may allow a user to dynamically manipulate the cluster structure in order that the user may find the information they need.

The document organizer processor may use interactive clustering methods in order to create query-dependent clusters that cater to the user's information needs by iteratively refining a grouping of a set of documents. In some embodiments, the document organizer processor provide the user with an overview of the search results by presenting documents in the form of categories or clusters, rather than a ranked list. The document organizer processor using interactive clustering methods may facilitate a query refinement process by allowing a user to select relevant categories (clusters), rather than requiring the user to formulate a precise query.

Clustering methods that may be used by the document organizer processor may be the Maximum Likelihood method, the Suffix Tree Clustering method, the Buckshot method, the Fractionation method, or any other suitable method. The Buckshot and Fractionation methods may work in conjunction with a conventional clustering method (e.g., single linkage, complete linkage, group average, minimum variance, etc.).

Clustering may be achieved by first determining a predetermined number of clusters in a distribution of documents by using the Maximum Likelihood method, the Suffix Tree Clustering Method, Buckshot method, Fractionation method, or any other suitable method. The document organizer processor may assign documents to the clusters. Clustering refinement methods may be iteratively applied until a stopping condition has been reached. In some embodiments, clustering refinement methods may recompute the cluster members for a distribution and reassign the documents to a cluster using the Maximum Likelihood method. In some other embodiments, a split method may separate poorly-defined clusters into better-defined clusters and a join method may merge similar clusters.

The Maximum Likelihood method may iteratively maximize the likelihood of a document cluster distribution to obtain homogeneous groupings of documents. The Buckshot method may choose a small random sample of documents and may preferably apply a group average method to produce a predetermined number of clusters. Since the documents are sampled randomly each time, the Buckshot method applied to the same corpus of documents at different times may not produce the same clusters. The Fractionation method may partition the documents into fixed-sized buckets, each of which may be preferably agglomerated by the group average method. The resulting clusters may be partitioned into buckets to be agglomerated. The process may be repeated until the predetermined number of clusters remains.

In some embodiments, Suffix Tree Clustering may be used by the document organizer processor to cluster documents based on shared phrases. The document organizer processor using Suffix Tree Clustering may first perform "stepping" (removing commonly used words from a document that are not critical to its meaning), as well as "stemming" (reducing a word to a root word). A data structure known as a suffix tree may be used to identify all base clusters. The base clusters may be combined by the document organizer processor by merging clusters with high degrees of overlap in their document sets. This step may create clusters by grouping documents that share related phrases with one another. Suffix Tree Clustering, which may be applied incrementally, creates overlapping clusters and uses phrases that consider both the order and position of words with which to cluster.

The present invention is now described in more detail in conjunction with FIGS. 1–8.

FIG. 1 shows an illustrative interactive document search system 100 which may include user computer 110, computer network 120, communication paths 130, server 140, document organizer processor 150, or any other suitable components. User computer 110 may be a personal computer, laptop computer, server, minicomputer, mainframe computer, supercomputer, handheld computer, personal digital assistant, cellular phone, or any other suitable device. As illustrated in FIG. 1, user computer 110 may include communications device 112. Communications device 112 may be a modem, Ethernet card, cable modem, DSL modem, network card, USB interface, serial interface, parallel interface, infrared interface, radio frequency interface, microwave frequency interface, optical interface, or any other suitable communications device or interface. Communications device 112 may be use to transmit and receive information, for example, from computer network 120 via communications path 130. User computer 110 may also include input device 114, which may be a keyboard, a mouse, a touch screen, or any suitable device for receiving user input. Input device 114 may be used, for example, to enter search queries, refine search queries, select summaries, select categories, select documents, or perform any other suitable function. User computer 110 may also include display device 116 that may display search queries, search results, retrieved documents, interactive search application displays (e.g., interactive search application displays illustrated in FIGS. 4–8), or any suitable information.

Computer network 120 may be the Internet, an intranet, a telephone network, a Local Area Network (LAN), a Wide Area Network (WAN), a Virtual Private Network (VPN), a Metropolitan Area Network (MAN), or any other suitable communications network. Computing devices, such as user computer 110, server 140, document organizer processor 150 or any other suitable device may be connected to computer network 120 via communication paths 130.

Communication paths 130 may be satellite communications paths, fiber-optic paths, wired communications paths, coaxial cable paths, radio frequency paths, microwave communications paths, lightwave paths, or any other suitable communications paths. Communication paths 130 may interconnect user computer 110, computer network 120, server 140, document organizer processor 150, or any other suitable devices.

Server 140 may be a computer, computer-based system, or any suitable combination of hardware and software. Server 140 may, for example, receive search queries for documents from computer network 120 or computing devices connected to computer network 120 via communication paths 130. Server 140 may contain web page data, a database of documents, or any other suitable information which may be searched by search engine processor 150. Server 140 may include a communications device such as a modem, Ethernet card, cable modem, DSL modem, network card, USB interface, serial interface, parallel interface, infrared interface, radio frequency interface, microwave frequency interface, optical interface, or any other suitable device or interface. Server 140 may use the communications device, for example, to communicate with user computer 110, computer network 120, document organizer processor 150, or any other suitable device.

Document organizer processor 150 may be a computer, computer-based system, or any suitable combination of hardware and software that may perform searches for documents, for example, on computer network 120 or computing devices (e.g., user computer 110, server 140, etc.) connected to computer network 120 via communication paths 130. Document organizer processor 150 may include communications device 152, search module 154, categorizer module 156, category labeler module 158, summarizer module 160, any combination thereof, or any other suitable components. Communications device 152, search module 154, categorizer module 156, category labeler module 158, or summarizer module 160 may be interconnected so as to be able to communicate information.

Document organizer processor 150 may include communications device 152. Communications device 152 may be a modem, Ethernet card, cable modem, DSL modem, network card, USB interface, serial interface, parallel interface, infrared interface, radio frequency interface, microwave frequency interface, optical interface, or any other suitable communications device or interface. Communications device 152 may, for example, receive search queries from user computer 110, transmit requests for documents to computer network 120 or server 140, or may perform any suitable communications.

Document organizer processor 150 may include search module 154. Search module 154 may be any hardware, software, or any combination thereof capable of performing a search for documents, for example, on computer network 120 or computing devices connected thereto (e.g., user computer 110, server 140). In some embodiments, search module 154 may search the Internet, intranets, databases, storage devices, directories, folders, network drive paths, any suitable combination thereof, or any suitable document storage location. In some other embodiments, search module 154 may, at least in part, utilize commercially available search engines (e.g., Google™, Alta Vista®, Excite$^{SM}$, Lycos®, etc.) to locate URLs (Uniform Resource Locator) or retrieve documents related to a search query received by communications device 152 of document organizer processor 150 from user computer 110.

Document organizer processor 150 may include categorizer module 156, which may be any hardware, software, or suitable combination thereof capable of clustering the documents retrieved by search module 154 into categories. In some embodiments, a predetermined number of categories may be defined wherein categorizer module 154 may cluster documents into a predetermined number of categories. Categorizer module 156 may cluster documents into categories using hardware, software, or any combination thereof capable of performing nonhierarchical clustering, hierarchical clustering, divisive clustering, agglomerative clustering, single linkage agglomerative clustering, complete linkage agglomerative clustering, group average agglomerative clustering, Maximum Likelihood clustering, Suffix Tree clustering, any combination thereof, or any other suitable clustering.

Document organizer processor 150 may include category labeler module 158. Module 158 may be any hardware, software, or combination thereof that may provide labels to the categories created by categorizer module 156. In some embodiments, the labels that may be chosen for categories by labeler module 158 may be based, at least in part, on the frequency of terms found in the documents of a category.

Document organizer processor 150 may include summarizer module 160. Module 160 may be any hardware, software or combination thereof that may generate summaries of the documents retrieved by search module 154. In some embodiments, summarizer module 160 may generate summaries for each document which may, for example, be 2–3 sentences in length. In other embodiments, document summaries may be any suitable length.

Figure 2:
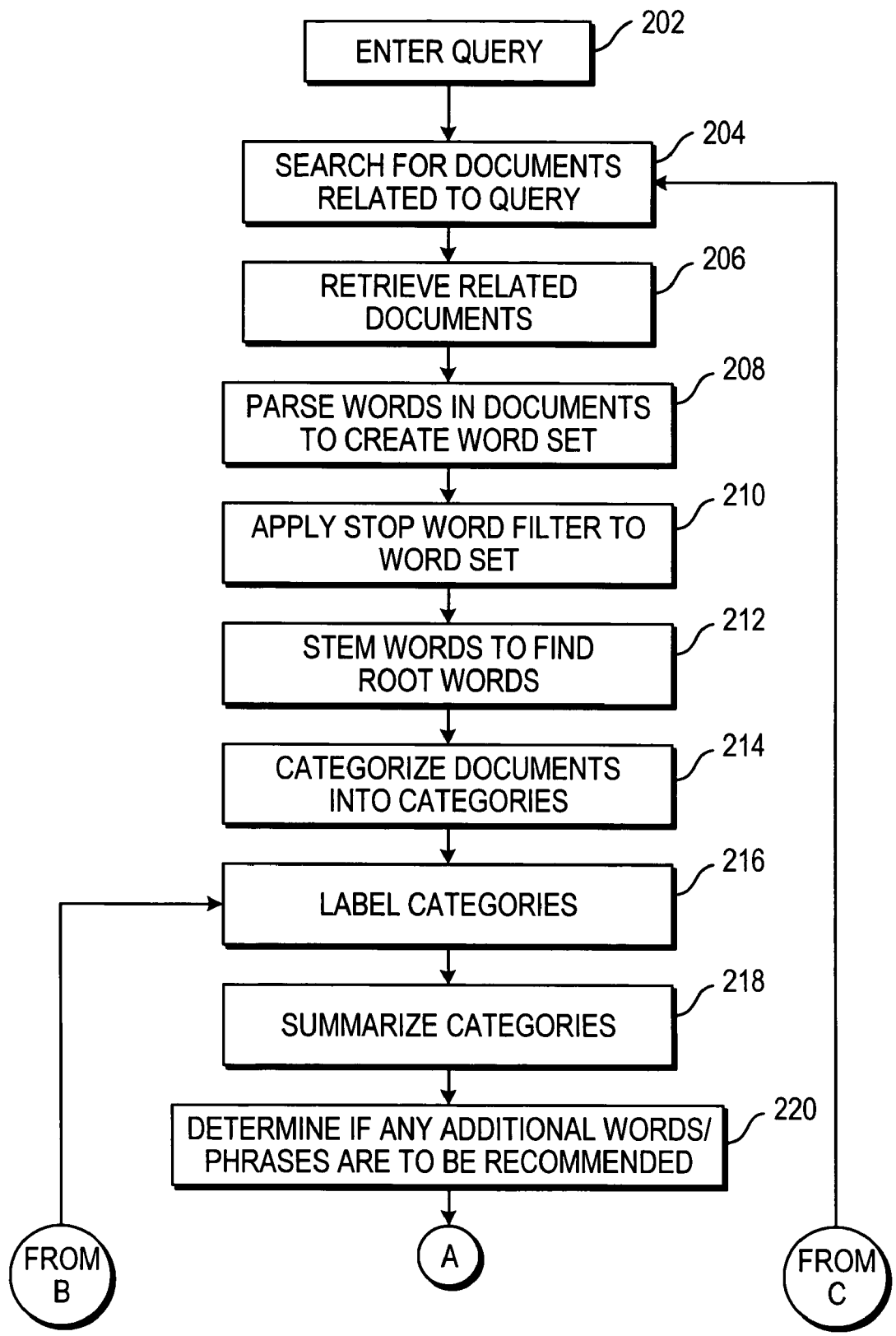
FIGS. 2 and 3 are illustrative flow diagrams of a method for document search and categorization in accordance with various embodiments of the present invention.
Figure 3:
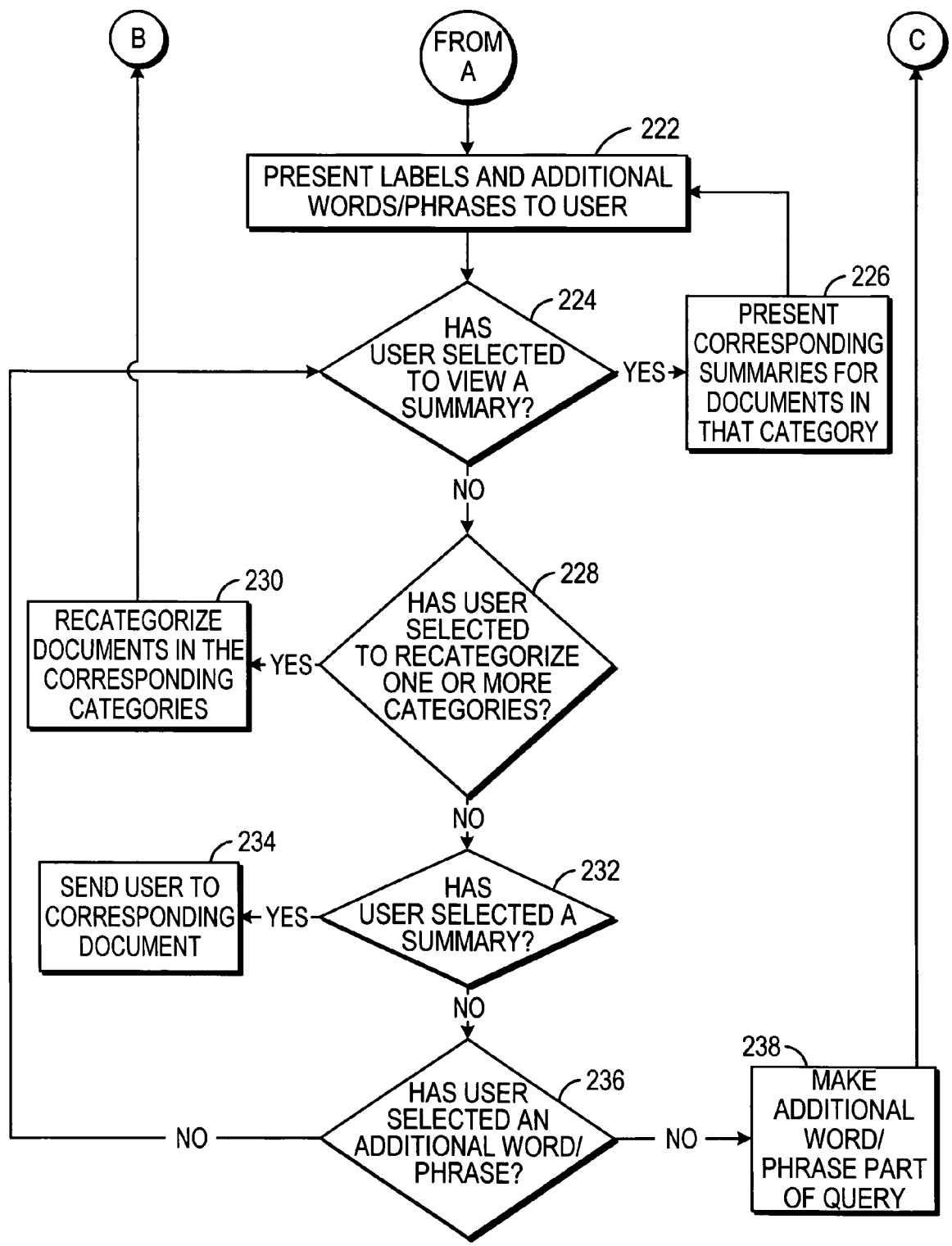

FIGS. 2 and 3 are illustrative flow diagrams of method 200 for interactive document search, retrieval, categorization, and summarization in accordance with various embodiments of the present invention. Method 200 may be performed, for example, by system 100 illustrated in FIG. 1.

Figure 4:
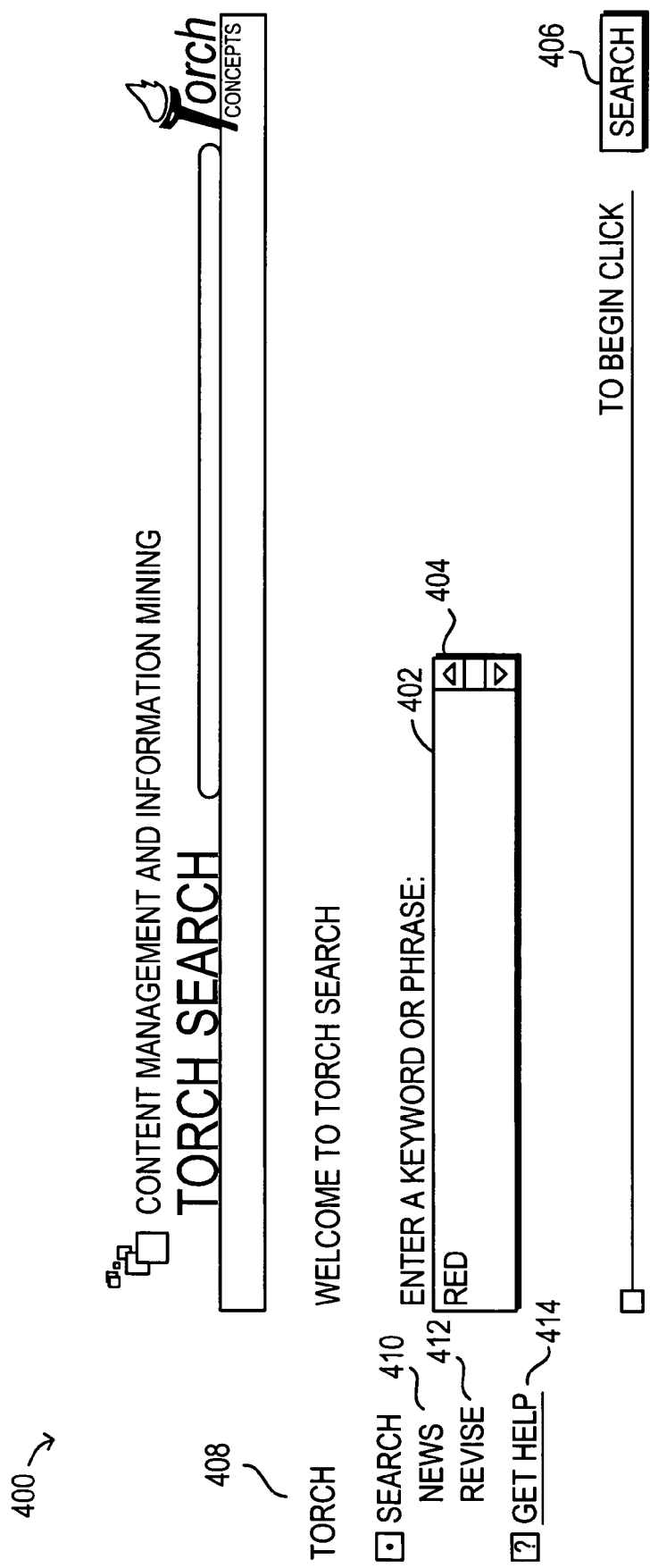
FIG. 4 shows an illustrative interactive search display in accordance with various embodiments of the present invention.

As shown in step 202 of FIG. 2, a user may enter a search query. The user may, for example, enter a search query into an interactive search application (e.g., text box 402 of display 400 as illustrated in FIG. 4) running on user computer 110 (FIG. 1). The query may be received by communications device 152 of document organizer processor 150 (FIG. 1). In addition to receiving a search query, document organizer processor 150 may receive instructions as to where document searching should occur. For example, a user may select the scope of the search to be the Internet, an intranet, specific web sites (or select to exclude searching specific web sites), a storage device (e.g., a hard drive), a network drive path, a folder, a directory or subdirectory, any suitable combination thereof, or any other suitable document storage location.

Once document organizer processor 150 (FIG. 1) receives the user query at step 202, processor 150 may search for documents related to the query at step 204. Processor 150 may use available web search engines (e.g., Google™, Alta Vista®, Excite$^{SM}$, Lycos®, etc.) to perform a search for URLs (Uniform Resource Locator) on the World Wide Web with the search query provided by the user. In one embodiment, a user may select at least one web search engine or a combination of search engines to perform a web search with the search query. In some other embodiments, document organizer processor 150 may use search module 154 to search the Internet, intranets, databases, storage devices, directories, folders, network drive paths, any suitable combination thereof, or any suitable document storage location.

Documents that may be related to the user's search query may be retrieved at step 206. The retrieved documents may be web pages, text documents, word processing documents (e.g., text files formatted in a Microsoft® Word format, WordPerfect® format, etc.), Adobe® Acrobat® PDF files, PostScript® files, any combination thereof, or any suitable documents. However, documents in proprietary formats (e.g., documents in Microsoft® Word format, etc.) may have to be converted into a standard text document format (e.g., ASCII text format, ANSI text format, UNICODE text format, rich text format (RTF), etc.) before parsing the words of the document at step 208 to create a word set. In some embodiments, word paring may be performed by a word parser module (not shown) of document organizer processor 150 (FIG. 1). A word set may be at least a portion of the parsed words from a retrieved document.

At step 210, a stop word filter may be applied to the parsed word set. In some embodiments, a filter module (not shown) of document organizer processor 150 may filter a predefined set of words from a document. The stop word filter may remove, for example, words such as "and," "or," "a," "an," "the," "is," or other suitable words. Such words may be removed since they may be unnecessary in the determination of the similarity between documents for categorization.

Next, at step 212, the parsed words of a word set may be stemmed to determine the root words of the parsed words. In some embodiments, a stemming module (not shown) of document organizer processor 150 (FIG. 1) may be used to determine root words. For example, the parsed word "bigger" may be stemmed to produce the root word "big." Similarly, step 212 may, for example, stem plural words into singular words, and may stem the different tenses of verbs. In some embodiments, step 212 may be eliminated to save time and system resources. In some other embodiments, stemming may be performed on terms of a user search query prior to searching at step 204.

Documents may be categorized by categorizer module 156 (FIG. 1) of document organizer processor 150 (FIG. 1) at step 214 (FIG. 2). The collection of retrieved documents may be categorized into clusters of similar documents. Categorizer module 156 may utilize a clustering method that iteratively maximizes the likelihood of a document cluster distribution to obtain homogenous groupings of the documents.

Categorizer module 156 may utilize a Maximum Likelihood method that iteratively maximizes the likelihood of a document cluster distribution to obtain homogenous groupings of the documents. The Expectation-Maximization (EM) method may be an iterative technique for determining a maximum likelihood of document clustering by computing a probability density function. Each iteration of EM may have an Estimation step and a Maximization step. The Estimation step may evaluate a probability distribution for the documents given predefined parameters from the previous iteration. The Maximization step may then determine a new parameter set that may maximize the probability distribution.

The iterative clustering and reclustering of documents into categories at step 214 (FIG. 2) may be achieved by categorizer module 156 (FIG. 1) performing the Maximum Likelihood method, Suffix Tree Clustering method, Buckshot method, Fractionation method, or any suitable clustering method (e.g., nonhierarchical clustering, hierarchical clustering, single linkage clustering, complete linkage clustering, group linkage clustering, minimum variance clustering, etc.).

In order to cluster documents into categories, document organizer processor 150 may provide measurement of document similarity by determining the frequency of words within documents and measuring the degree of word overlap between documents. In some embodiments, a similarity matrix may be constructed whose elements may contain similarity score measurements for all of the document pairs to be clustered.

In some embodiments, a vector module (not shown) of document organizer processor 150 (FIG. 1) may form vectors that may represent words in a particular document or word set. In some embodiments, the vectors may be multi-dimensional (e.g., one dimension for each component of the vector). Each component of the vector may have a value representing the occurrence of a word or words in a document. In some embodiments, the components of a vector may be represented in a binary code. A document may be represented by a collection of vectors which comprise a characterization that may be used to describe concepts. In some embodiments, the vector module of document organizer processor 150 (FIG. 1) may use a similarity measurement which determines the similarity between documents by comparing each component of the vectors of the documents (e.g., compare binary components of vectors to determine similarities between vectors, where similar vectors may have more components in common).

The clustering of documents into categories by document organizer processor 150 (FIG. 1) may be achieved by choosing a desired number of categories. For example, document organizer processor 150 may have a predefined maximum number of categories (e.g., 15–20). Each document in the collection of documents retrieved at step 206 may be assigned to the closest category, for example, by categorizer module 156 (FIG. 1) of document organizer processor 150 (FIG. 1).

Cluster methods used by the document organizer processor may iteratively build upon its results to find the desired number of clusters. Topical clusters may be determined based upon the distribution of the vectors. In some embodiments, the clusters may be determined by finding the maximum likelihood of the cluster distribution.

After categorizer module 156 (FIG. 1) of document organizer processor 150 (FIG. 1) has performed an initial categorization (clustering) by using, for example, the Maximum Likelihood method, the user may select to recategorize (recluster) the documents to refine a search. In one embodiment, the user may refine the search by selecting at least one category in order to sub-categorize (recluster) the documents. The recategorization may be achieved, for example, by iterating the Maximum Likelihood method for clustering. Preferably, this process may be iterated a small fixed number of times, since the process may make the greatest gains within the first few iterations as the number of documents in each cluster becomes smaller.

In some embodiments, a split method may separate poorly defined categories (clusters) into well-separated parts and a join method may merge categories (clusters) which may be too similar. The split method may divide a cluster into two new clusters. In one embodiment, the division into two clusters may be accomplished by applying a clustering method (e.g., Maximum Likelihood method, Suffix Tree Clustering method, Buckshot method, Fractionation method, etc.) but without performing any refinement (reclustering). The join method may merge categories (clusters) that are not usefully distinguished by their current categorization. While at least two categories (clusters) to be merged may not have "typical" documents in common, the categories to be merged may have documents with "topical" words that may overlap.

Next, the categories of the clustered documents may be labeled at step 216 illustrated in FIG. 2 by category labeler module 158 of document organizer processor 150 (FIG. 1).

Step 216 may score word groups within a category on the basis of their occurrence by document and throughout the documents. Scoring may be performed based on numerical weighting of words. Category labels may be selected from a combination of high scoring word groups, any other suitable combination of words, or by using any other suitable method. The category labels may be presented to the user at step 222 (FIG. 3).

Summarize categories step 218 (FIG. 2) may create summaries of the labeled categories. Step 218 may, for example, be performed by summarizer module 160 (FIG. 1) of document organizer processor 150 (FIG. 1). Step 218 may numerically score sentences in a document on the basis of the numerical weighting of the relevant words for a particular category. Sentences to be used for a document summary may be selected based upon their numerical score. Alternatively, any other suitable method of creating summaries may be used. Document summaries preferably include three sentences, but may be any desirable number.

As illustrated in step 220 of FIG. 2, it may be determined whether any additional words or phrases may be recommended to the user to revise the search query. For example, words such as "cardiac" may be recommended to the user if a search query contains the word "heart." Recommended terms may be selected by determining the frequency of terms in documents other than the terms used in a search query, or by any other suitable method. Recommended search terms may be displayed to the user at step 222 (FIG. 3). In some embodiments, the user may select category names to be used as additional search terms.

Turning to FIG. 3, test 224 may determine whether the user has selected to view document summaries. In one embodiment, a user may select to view summaries of documents in a particular category by selecting the category label. If the user selects to view a summary at test 224, the corresponding summaries for the documents in a selected category may be displayed at step 226. Upon review of the document summary information, the user may select to display the category labels, as well as recommended additional search terms words or phrases at step 222. In some embodiments, category labels and summaries may be concurrently displayed as illustrated in display 800 of FIG. 8.

If the user has not selected to view a summary at test 224 (FIG. 3), test 228 may determine if a user has selected to recategorize one or more categories. In some embodiments, if the user selects a category, the documents within the selected category may be recategorized by subcategories. Recategorization may be performed, for example, by category module 156 (FIG. 1) of document organizer processor 150 (FIG. 1). In other embodiments, the user may select categories to be combined, and the document organizer processor may create new categories based on the combination of the selected categories. If the user selects to recategorize one or more categories at test 228 (FIG. 3), recategorization of documents into the corresponding categories may take place at step 230 (FIG. 3). Step 230 may be functionally similar to step 214 (FIG. 2). Upon recategorization, the categories may be labeled at step 216 (FIG. 2).

If the user has not selected to recategorize one or more categories at step 228 (FIG. 3), step 232 may determine whether a user has selected a summary in order to view the document. Alternatively, step 232 may determine whether the user has selected a link to a document. If the user has selected a summary or link to a document, the corresponding document may be displayed, for example, on display device 116 (FIG. 1) of user computer 110 (FIG. 1) at step 234 (FIG. 3).

If the user has not selected a summary or document link at step 232, step 236 may determine whether the user has selected to modify the search query by using suggested words or phrases. Alternatively, step 236 may determine whether the user has selected category labels to be used as search terms in a modified search query. If the user has selected an additional word or phrase at step 236, the selected additional word or phrase may be made part of the search query at step 238. If the user has selected category labels and indicated that these labels are to be part of a revised search query, the selected category labels may be added to the search query at step 238. Upon revision of the search query at step 238, step 204 (FIG. 2) may search for documents related to the query. If the user has not selected an additional word, phrase, or category label at step 236 to be added to the search query, step 224 may determine whether the user has selected to view a summary. Alternatively, category labels and summaries may be displayed as illustrated in display 800 of FIG. 8.

Interactive search and categorization displays illustrated in FIGS. 4–8 may be presented on a suitable display device component of a computing device such as user computer 110 (FIG. 1). FIG. 4 shows an illustrated interactive search display 400 in accordance with various embodiments of the present invention. A user may enter a keyword or phrase (e.g., the word "red" as shown in display 400) to be used in text box 402. The user may enter multiple keywords or phrases in text box 402. Scrollbar 404 may be manipulated by a user in order to view entered words or phrases in text box 402. A user may select search button 406 after keywords or phrases have been entered in text box 402.

Menu 408 may provide options for a user to perform a new search, revise a search, obtain help, or any other suitable option. If the user selects new search option 410, text box 402 may be cleared and keywords or phrases may be entered. If the user selects revise option 412, the user may append additional keywords or phrases to the search terms in text box 402. The user may select help option 414 in order to receive instructions for using the search system, suggestions for creating or revising a search, or any other suitable information related to searching and retrieving documents. Menu 408 may appear in displays illustrated in FIGS. 4–7.

Figure 5:
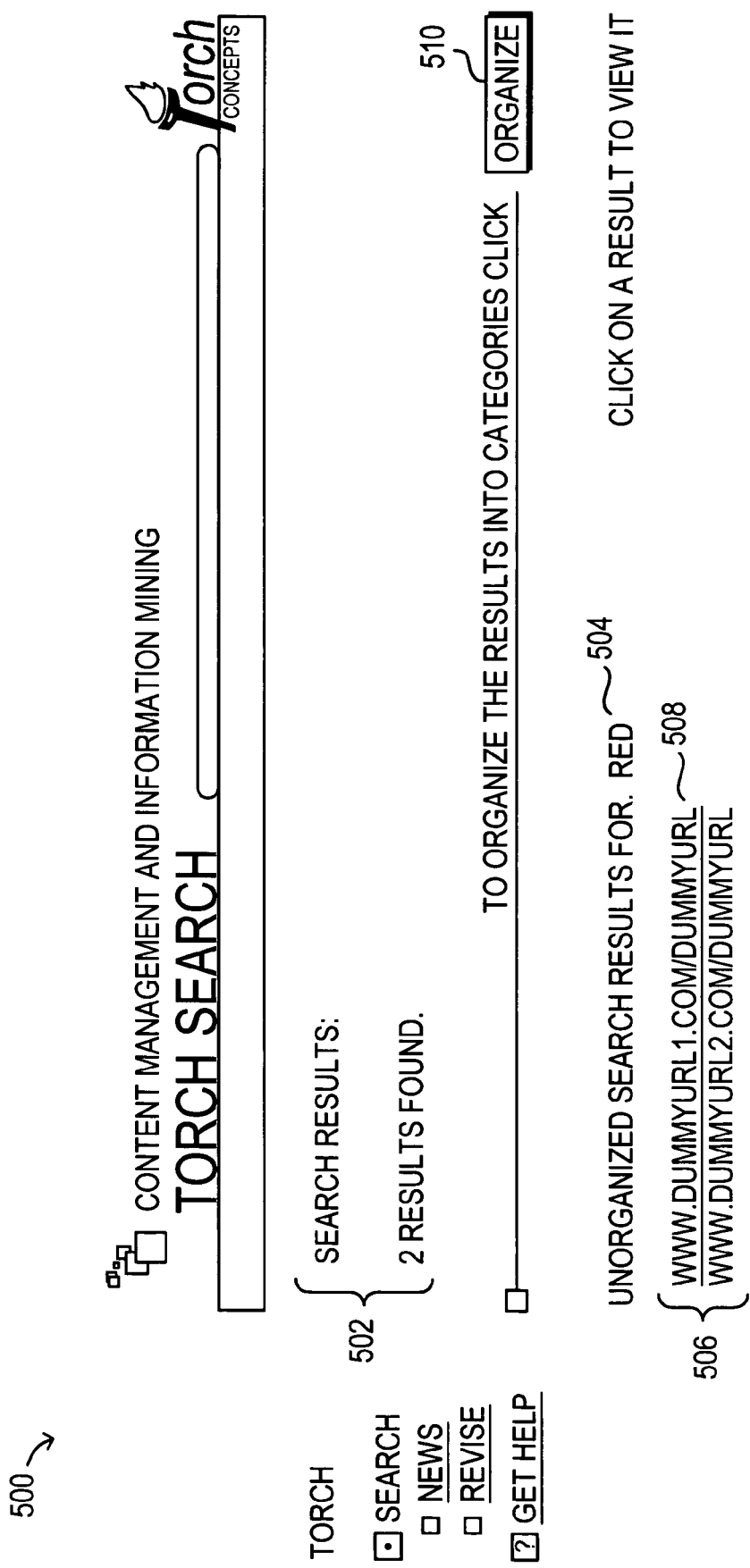
FIG. 5 shows an illustrative interactive search display with search results in accordance with various embodiments of the present invention.

Display 500 illustrated in FIG. 5 may be presented after the user selects search button 406 (FIG. 4) to process the search request. Area 502 may display the number of documents found by document organizer processor 150 (FIG. 1) that are related to the search. Area 504 may display the keywords or phrases of the search query. Results 506 may be a list of links to documents, web pages, or other suitable material that represent the results from the search. If the user selects link 508, a document corresponding to the link may be retrieved and displayed. The user may select organize button 510 to categorize the results of the search. Alternatively, the results of the search may be automatically categorized and displayed to the user.

Figure 6:
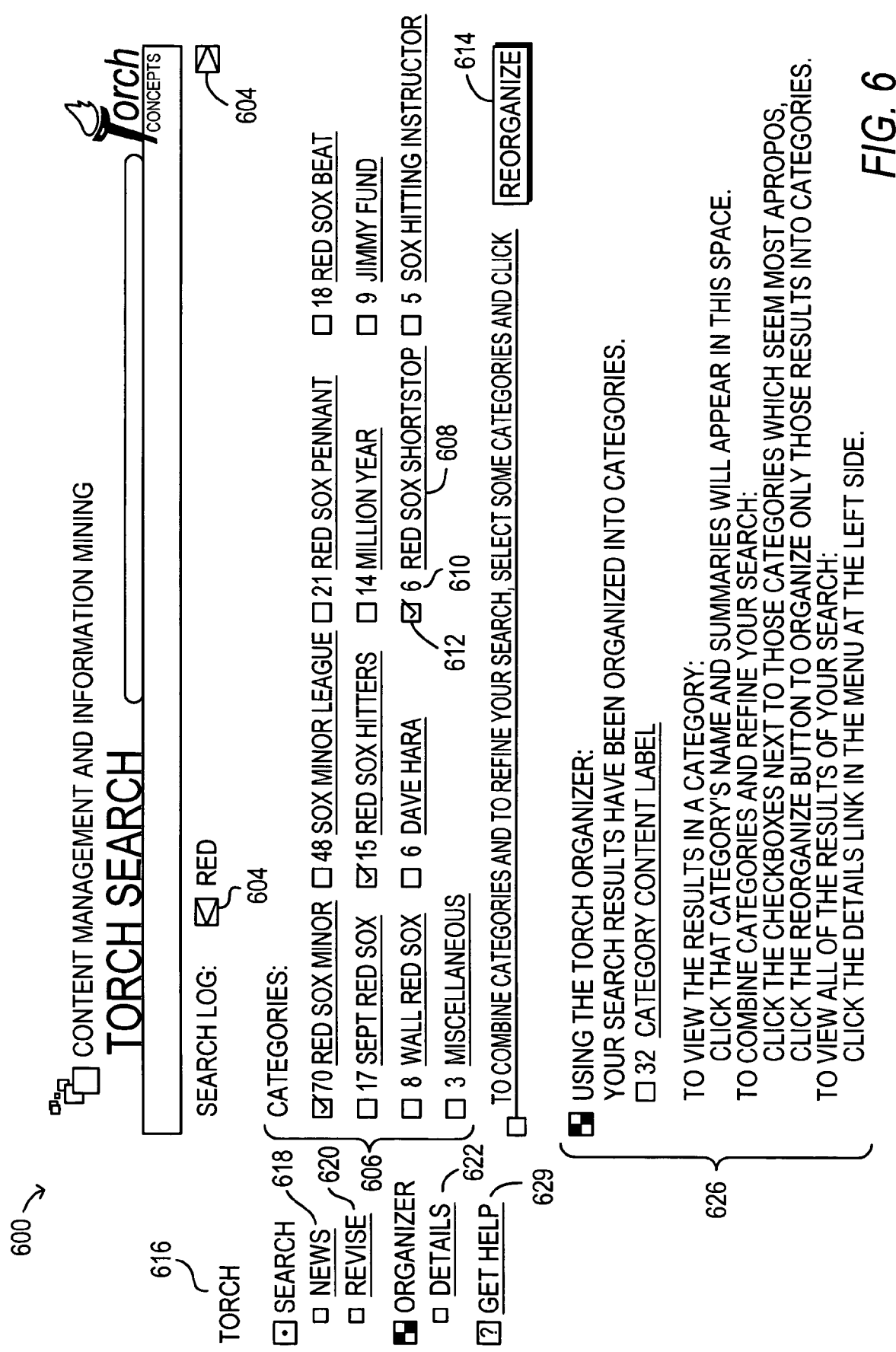
FIG. 6 shows an illustrative interactive document organizer display with selectable display categories in accordance with various embodiments of the present invention.
Figure 7:
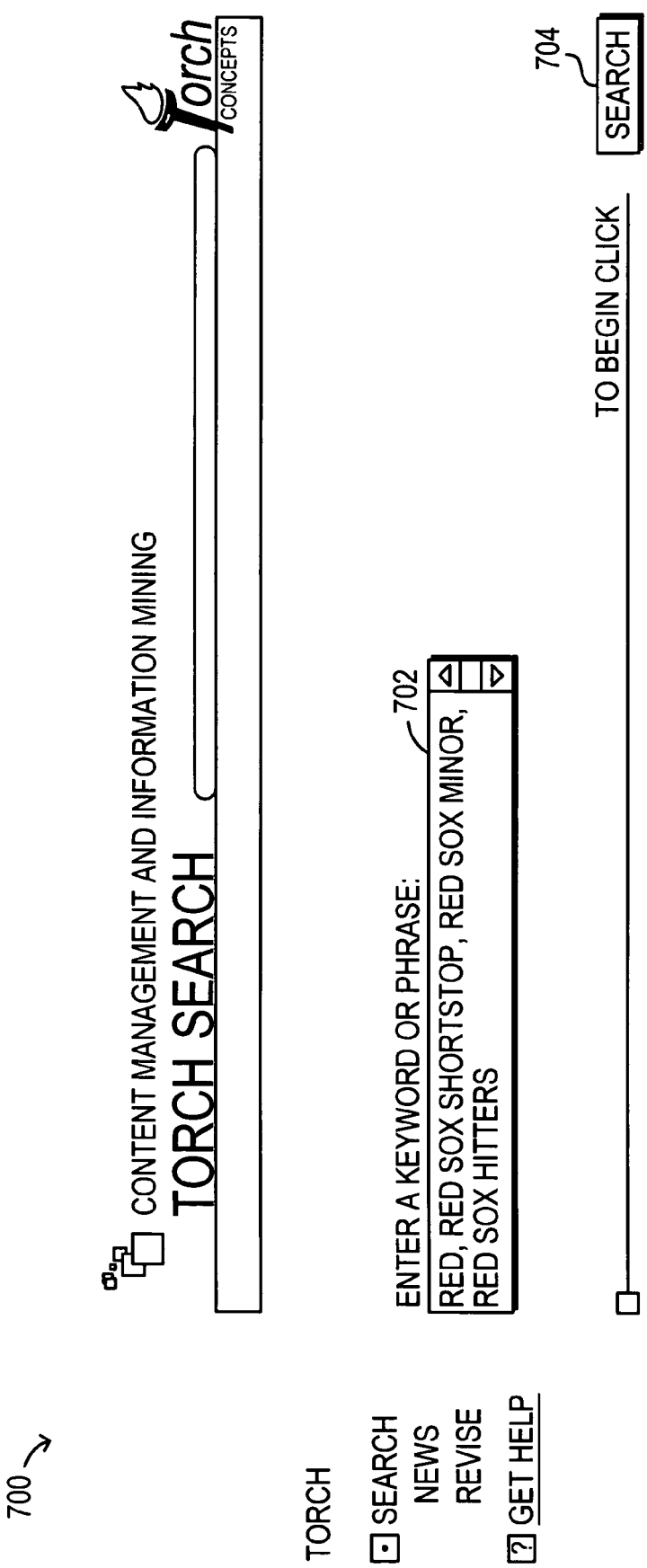
FIG. 7 shows an illustrative interactive search display with keyword or phrase modification in accordance with various embodiments of the present invention.

If the user selects organize button 510, display 600 illustrated in FIG. 6 may be presented to the user. Search log area 602 of display 600 may present a list of keywords of the current search or previous searches. Alternatively, search queries may be titled, and the titles may be displayed in area 602. Arrows 604 may be selected by the user to traverse the list of search queries in search log area 602.

Categories may be created for the documents retrieved from the search (e.g., categorization step 214 and label categories step 216 of process 200, illustrated in FIG. 2), and may be listed in category area 606. Category content label 608 may inform the user as to the subject matter of the retrieved documents grouped in that category. Label 608 may be selected by a user to display summaries of the documents grouped in the selected category. Document number 610 may be affiliated with a category content label and may inform the user as to the number of documents retrieved that are grouped with the category content label. Checkbox 612 may be associated with a category content label. Categories may be combined by selecting the checkbox corresponding to the category. Once the categories have been selected, reorganize button 614 may be selected to organize the documents of the selected categories into new categories. Reorganization may be performed, for example, by steps 228 and 230 illustrated in FIG. 3.

In some embodiments, the search may be refined by selecting the checkboxes of category labels, and then selecting revise option 620 from menu 616. Thus, category labels may be added to the search query as search terms, for example, as illustrated in display 700 of FIG. 7. The original keywords or phrases may be present in text box 702, along with the selected category labels. The user may modify the keywords or phrases in text box 702 if desired, and then may select search button 704 to perform a search.

As illustrated in FIG. 6, menu 616 may provide options for a user to perform a new search, revise a search, obtain details on the organizer, obtain help, or any other suitable option. If the user selects new search option 618, display 400 of FIG. 4 may be displayed and the user may enter a new search query. If the user selects revise option 620, display 400 of FIG. 4 may be presented and the user may append additional keywords or phrases to the search terms in text box 402. The user may select details option 622 in order to retrieve information related to the organizer. If option 622 is selected, the organizer information may be displayed in area 626. The user may select help option 624 in order to receive instructions for using the search system, suggestions for creating or revising a search, or any other information related to searching and retrieving documents. In some embodiments, area 626 may display instructions relating to viewing the results in a category, combining categories, refining a search, viewing the results of a search, any combination thereof, or any other suitable information. In some embodiments, area 626 may display category content label, links to documents clustered with the category content label, summaries of documents, any combination thereof, or any other suitable information.

Upon selection of reorganize button 614, display 800 of FIG. 8 may be presented. Search listing 802 may present the search keywords or phrases of the current search or past searches. Results 804 may display the number of search results for each of the searches in search listing 802. Categories list 806 may present the category content labels for the documents retrieved using the current search. Category content label 808 may be selected in order to view summaries of the documents in the category. Results number 810 may indicate the number of documents associated with category content label 808. In some embodiments, category content labels, links to documents, summaries, any combination thereof, or any other suitable information may be displayed in area 812.

Summaries area 812 may provide document links 816 and individual summaries 818 for selected category label 814. Selection of link 816 may present the selected document to the user for viewing. Summary 818 may be several sentences describing the content of document retrievable by link 816.

Thus it is seen that systems and methods for interactive document search, retrieval, categorization, and summarization have been provided. One skilled in the art will appreciate that the present invention can be practiced by other than the described embodiments, which are presented for purposes of illustration rather than of limitation, and the present invention is limited only by the claims which follow.

What is claimed is:

1. A method for interactive document searching comprising:
   receiving a search query;
   searching for documents using the search query;
   retrieving documents located during the searching;
   clustering the retrieved documents into categories;
   labeling the categories of documents from the clustering;
   summarizing the retrieved documents;
   displaying the labeled categories and document summaries;
   parsing words of the retrieved documents to create word sets before the clustering of retrieved documents into categories; and
   filtering a set of predefined words from the word sets.

2. A method for interactive document searching comprising:
   receiving a search query;
   searching for documents using the search query;
   retrieving documents located during the searching;
   clustering the retrieved documents into categories;
   labeling the categories of documents from the clustering;
   summarizing the retrieved documents; and
   displaying the labeled categories and document summaries;
   parsing words of the retrieved documents to create word sets before the clustering of retrieved documents into categories; and
   assigning a numerical weight value to the parsed words in each document based on their frequency of appearance in the document.

3. The method of claim 2, further comprising determining root words from the received search query before the searching for documents.

4. The method of claim 3, further comprising modifying the received search query with the determined root words before the searching for documents.

5. The method of claim 2, wherein the clustering of documents into categories comprises determining similarities between the retrieved documents and grouping the similar documents into clusters.

6. The method of claim 2, further comprising forming at least one vector based on at least one word set.

7. The method of claim 6, wherein the similarity between documents is determined by comparing a plurality of vectors.

8. The method of claim 2, further comprising suggesting words to be added to the search query after the displaying of the labeled categories and document summaries.

9. The method of claim 2, further comprising after the displaying:
   receiving a selection of a category;
   reclustering the documents into categories based on the received selection;
   labeling the reclustered categories;
   summarizing the documents in the reclustered categories; and displaying the labeled reclustered categories and document summaries.

10. The method of claim 2, further comprising after the displaying:
receiving a selection of a document; and
displaying the selected document.

11. A system for interactive document searching comprising:
means for receiving a search query;
means for searching for documents using the search query;
means for retrieving documents located by the searching means;
means for clustering the documents retrieved by the retrieving means into categories;
means for labeling the categories from the clustering means;
means for summarizing the documents retrieved by the retrieving means;
means for displaying the labeled categories from the labeling means and the summaries from the summarizing means;
means for parsing words of the retrieved documents to create word sets before clustering the retrieved documents into categories by the clustering means; and
means for filtering a set of predefined words from the word sets.

12. The system of claim 11, further comprising means for determining root words from the received search query before searching for documents with the searching means.

13. The system of claim 12, further comprising means for modifying the received search query with the determined root words before searching for documents with the searching means.

14. The system of claim 11, wherein the means for clustering documents into categories comprises means for determining similarities between retrieved documents and grouping the similar documents into clusters.

15. The system of claim 11, further comprising means for suggesting words to be added to the search query after displaying of the labeled categories and document summaries with the displaying means.

16. The system of claim 11, further comprising:
means for receiving a selection of a category;
means for reclustering the documents into categories based on the selection from the receiving means;
means for labeling the categories from the reclustering means;
means for summarizing the documents in the reclustered categories; and
means for displaying the labels from the labeling means and document summaries from the summarizing means.

17. The system of claim 11, further comprising:
means for receiving a selection of a document; and
means for displaying the selected document.

18. A system for interactive document searching comprising:
means for receiving a search query;
means for searching for documents using the search query;
means for retrieving documents located by the searching means;
means for clustering the documents retrieved by the retrieving means into categories;
means for labeling the categories from the clustering means;
means for summarizing the documents retrieved by the retrieving means;
means for displaying the labeled categories from the labeling means and the summaries from the summarizing means;
means for parsing words of the retrieved documents to create word sets before clustering the retrieved documents into categories by the clustering means; and
means for assigning a numerical weight value to the parsed words in each document based on their frequency of appearance in the document.

19. The system of claim 18, further comprising means for forming at least one vector based on at least one word set.

20. The system of claim 19, wherein the means for determining the similarity between documents is determined by means for comparing a plurality of vectors.

21. An interactive document search system comprising:
an input device for receiving a search query;
a communications device for communicating with a computer network;
a search module for searching and retrieving documents on the computer network using the communications device based on the search query received from the input device;
a categorizer module for clustering the documents retrieved by the search module into categories;
a category labeler module for labeling the categories of clustered documents from the categorizer module;
a summarizer module for summarizing the documents categorized by the categorizing module; and
a display device for displaying the labels from the labeler module and the summaries from the categorizer module;
a word parser module that parses words from the documents retrieved by the search module to create word sets; and
a filter module that filters a set of predefined words from the word sets formed by the word parser module.

22. The system of claim 21, further comprising a stemming module that determines root words from the search query received by the input device.

23. The system of claim 22, wherein the stemming module modifies the search query received by the input device.

24. The system of claim 21, wherein the categorizer module clusters documents into categories by determining similarities between the documents retrieved by the search module and grouping the similar documents into clusters.

25. An interactive document search system comprising:
an input device for receiving a search query;
a communications device for communicating with a computer network;
a search module for searching and retrieving documents on the computer network using the communications device based on the search query received from the input device;
a categorizer module for clustering the documents retrieved by the search module into categories;
a category labeler module for labeling the categories of clustered documents from the categorizer module;
a summarizer module for summarizing the documents categorized by the categorizing module; and a display device for displaying the labels from the labeler module and the summaries from the categorizer module;

a word parser module that parses words from the documents retrieved by the search module to create word sets, wherein the word parser module assigns a numerical weight value to the parsed words in each document based on their frequency of appearance in the document.

26. The system of claim 25, further comprising a vector module wherein the processor forms at least one vector based on at least one word set formed by the word parser module.

27. The system of claim 26, wherein the vector module determines the similarity between documents by comparing a plurality of vectors.

* * * * *